Patented June 3, 1930

1,761,810

REISSUED

UNITED STATES PATENT OFFICE

AUGUST P. BJERREGAARD, OF OKMULGEE, OKLAHOMA, ASSIGNOR TO DOHERTY RESEARCH COMPANY, OF NEW YORK, N. Y., A CORPORATION OF DELAWARE

PROCESS OF TREATING GASOLINE AND THE PRODUCT THEREOF

No Drawing. Application filed July 30, 1926. Serial No. 126,090.

This invention relates to a process for the treatment of gasolines for the purpose of rendering them resistant to the action of light and particularly to the action of sunlight.

It is well known that most gasolines, especially those gasolines which are blends of cracked gasoline and the so-called straight run gasoline derived directly from natural crude petroleum oils by distillation, lose their clearness when exposed to sunlight and even when exposed to diffused daylight. This loss of clearness is due to a cloudy formation or precipitate which develops in the gasoline because of its exposure, which cloudy formation later separates out as a gummy resinous-like material. Frequently the gasoline becomes discolored due to the action of light, while in other cases the cloudy formation is milkish white.

The result of the action of light on gasoline as above referred to is very detrimental because the cloudiness or discolor detracts from the appearance of the gasoline and more particularly because the gummy resinous material settles out and adheres to the glass sides of measuring cylinders or bowls discoloring them and rendering them unsightly. Furthermore, when the gasoline containing this cloudy formation or resinous material is used as a motor fuel the gummy resinous material has a tendency to deposit in the feed lines, on the parts of the carbureter and other parts of the engine with which it comes into contact and thereby interferes with the proper functioning of the motor.

The object of the present invention is to provide a process for the treatment of gasolines which are subject to the defect or defects referred to above whereby the formation of cloudiness or discoloration therein is prevented when the gasoline is exposed to light.

In accordance with the object stated the invention comprises forming a permanent mixture by adding to the gasoline to be treated a substance which will render the gasoline stable in the presence of light, that is, a substance which will prevent the appearance or formation of the cloudiness or discoloration referred to.

The process of the present invention differs from known processes of treating gasoline in that no residue or polymerized hydrocarbon material is removed by filtering or decanting as is the case where the gasoline is treated with an acid, an alkali or a solution of some salt.

I have found by extensive investigation in respect to this phenomenon of cloud formation in gasolines exposed to light, that all substances soluble in gasoline may be divided into three classes, first, those in which accelerate the formation of cloud, second, those which retard or prevent the formation of cloud, and third, those which neither accelerate or inhibit and which are, so to speak, indifferent to the phenomenon of cloud formation in gasolines exposed to light.

My novel process, therefore, is based on the fact discovered by me, that some substances when mixed with gasoline possess the above mentioned retarding or inhibiting influence on cloud formation when the gasoline mixture is exposed to light. These retarding or cloud preventing substances act efficiently when present in extremely small quantities, suggesting that their effect is due to a catalytic influence, or assuming that light acts as a catalyst in causing the formation of cloud in gasolines, the influence referred to may be more properly called anti-catalytic in its nature since it annuls the action of light.

In carrying the process into effect a small quantity of one or more of these substances which retard or prevent the formation of cloud in gasoline when exposed to light is mixed with or dissolved in the gasoline in any convenient manner either before or after the gasoline leaves the refinery.

Among the substances found to be suitable anti-catalysts in the process are: certain complex hydrocarbons, for example, anthracene, phenanthrene and certain phenolic substances, for example, phenol, orthocresol, metacresol, paracresol and guaiacol. These substances all contain one or more benzene rings and therefore may be referred to as derivatives or homologues of benzene. While I have named several substances possessing this anti-catalytic property I have found anthracene to have this property to a much greater extent than the others.

Apparently some factor in the inner structure of the molecule plays a part in the influence that any given substance will exert on the reaction caused by light. This may be illustrated for example, by the difference between the action of guaiacol, eugenol and isoengenol. As far as the phenolic part of their molecules are concerned these substances have the same constitution, but eugenol and isoengenol in addition have an unsaturated chain in their molecule. Guaiacol is a good anti-catalyst, whereas, eugenol and isoengenol have the opposite effect in that they accelerate the formation of cloud in the same gasoline. Yet the presence of unsaturated bonds in and of themselves apparently do not accelerate cloud formation in gasoline exposed to light, because anthracene, phenanthrene and other compounds which contain unsaturated bonds are good anti-catalysts.

It is also true that the type or character of the gasoline treated has some effect on the usefulness of any particular cloud retarding substance. For example it may be necessary with a gasoline from a certain source, to use larger amounts of the particular retarding substance and in some cases to use a different substance since it is obvious that all substances which may be used do not act with equal efficiency. The extensive use of anthracene as an anti-catalyst has shown that gasolines from certain sources and from certain refining treatments require less anti-catalyst than other gasolines.

The amount of anti-catalyst used as intimated above depends on the gasoline and the retarding substance, but I have found that two to four pounds of the anti-catalyst to 100 barrels of gasoline (approximately 0.008% to 0.016% anti-catalyst, on the basis of 66° Bé. gravity gasoline) is sufficient in most cases. In using anthracene alone from 2 to 15 pounds per 1000 barrels of gasoline have been found to be sufficient in most cases.

No special apparatus is required for the process, it being sufficient to dissolve the anti-catalyst in the gasoline. If necessary the mixture may be agitated to facilitate solution of the substance in the gasoline and this agitation may be accomplished by any known method or apparatus.

The presence of the anti-catalyst in the treated gasoline in no way detracts from the usefulness of the gasoline as a motor fuel since the substances used are mainly organic compounds and burn readily with the gasoline or motor fuel. Furthermore, their proportion in the gasoline is so small as to be negligible.

The process of the present invention may be applied to the gasoline either before or after the regular refinery treatment with sodium plumbite but the anthracene or other compound is preferably added after the gasoline has been sweetened by the plumbite treatment.

The treatment of gasoline by the present invention is intended primarily to make gasoline light stable and prevent the formation of resinous compounds in them. This process may be applied to any gasoline which has been refined and has a proper color, whether or not the refining has employed the use of well known chemicals or filtering for getting the proper color. In other words, the present invention may be applied to any gasoline as supplemental to the usual refining and treating processes, in order to make the gasoline light stable and prevent the formation of resinous compounds.

The following examples will illustrate the effect of sunlight on the various types of gasoline and the gum or cloud retarding or accelerating effect of the substances added.

*Example No. 1.*—In the following tests the gasoline used was a 50-50 blend of straight-run and cracked gasoline derived from Kansas crude, each portion of the blend being separately sweetened to the "doctor" test by "doctor" solution and a trace of sulphur.

Sample No. 1—Nothing added.
Sample No. 2—2 milligrams of anthracene added per 110 c. c. of gasoline.
Sample No. 3—4 milligrams of anthracene added per 110 c. c. of gasoline.
Sample No. 4—6 Milligrams of anthracene added per 110 c. c. of gasoline.

Each of these samples were exposed to sunlight for nine hours after which they showed the following condition:

Sample No. 1—Dense, cloudy and yellow.
Sample No. 2—Cloudy and yellow.
Samples 3 and 4—Clear, brilliant and white with no discoloration.

*Example No. 2.*—With straight-run gasoline derived from Kansas crude and sweetened by "doctor" treatment the following results were obtained:

Sample No. 10—Nothing added.
Sample No. 11—2 milligrams of anthracene added per 110 c. c. of gasoline.
Sample No. 12—4 milligrams of anthracene added per 110 c. c. of gasoline.

After exposing these samples to sunlight for four hours the following conditions were shown:

Sample No. 10—Very cloudy and slightly yellowish.
Sample No. 11—Extremely faint haze but white.
Sample No. 12—Clear and white.

*Example No. 3.*—The gasoline used in the following tests was a 50-50 blend of straight-run and cracked gasoline derived from a Healdton (Texas) crude, each sample being made sweet to the "doctor" test.

Sample No. 14—Nothing added.

Sample No. 15—6 milligrams of anthracene added per 110 c. c. of gasoline.

Sample No. 17—10 milligrams of carbazol A added per 110 c. c. of blend.

Sample No. 18—10 milligrams of carbazol B added per 110 c. c. of blend.

After two hours exposure to sunlight these samples showed the following conditions:

Sample No. 14—Cloudy.
Sample No. 15—Clear.
Sample No. 17—Very cloudy; more cloudy than No. 14.
Sample No. 18—Very cloudy; more cloudy than No. 14.

The examples and tests given above clearly show the cloud or gum retarding effect of anthracene which is similar to other substances mentioned. Likewise the results illustrated by Samples No. 17 and No. 18 show the effect of accelerating agents on gum formation.

As a result of the action of an anti-catalyst such as anthracene in preventing gum formation in cracked gasoline or motor fuels containing unsaturated or other unstable compounds, the olefins or other unsaturated substances which are ordinarily polymerized to gums, are preserved in substantially their original forms in the motor fuel or gasoline. The anti-catalyst, therefore, besides preventing gum formation has the additional effects of preventing loss of important gasoline constituents, and of increasing the anti-knock value of the gasoline.

Where in the claims anthracene or any of the other substances mentioned above are specified, it is to be understood that the claims are intended to cover the use of equivalent substances which have the property of anthracene in inhibiting gum formation in gasoline.

Having thus described my invention, I claim:—

1. The process of treating gasolines to render them light stable, comprising agitating gasoline in the presence of sodium plumbite to render the gasoline sweet, and dissolving in the gasoline a small proportion of anthracene.

2. The process of inhibiting gum formation in a blend of cracked and straight run gasoline, which comprises mixing and dissolving in said gasoline anthracine, said anthracene being used in a ratio of not more than four pounds of anthracene to 100 barrels of gasoline.

3. The process of inhibiting the formation of gum in motor fuels containing cracked gasoline which after exposure to light show a cloudy appearance, which comprises dissolving in said motor fuel a quantity of anthracene, said anthracene being used in a ratio of not more than about one one-hundredth of one per cent by weight of the motor fuel.

4. The process of inhibiting gum formation in gasoline due to the action of light, which comprises refining the gasoline with sodium plumbite, and thereafter dissolving in the gasoline a small proportion of a substance adapted to make the refined gasoline stable to light, said substance comprising substantially only anthracene.

5. The process of inhibiting the formation of gum in gasoline, which comprises mixing therewith and dissolving therein material selected from the aromatic group comprising anthracene and phenanthrene, said material being mixed with the gasoline in sufficient quantity to inhibit the formation of gum therein but in a ratio of not more than about one one-hundredth of one per cent by weight of the gasoline.

6. The process of inhibiting the formation of gummy precipitates in a motor fuel comprising a blend of cracked and straight run gasoline, which comprises mixing therewith and dissolving therein a substance selected from the group comprising anthracene and phenanthrene, whereby said fuel is stabilized to prevent the precipitation of gum therein, said substance being used in a ratio of not more than two pounds to 100 barrels of gasoline treated.

7. The process of inhibiting gum formation in gasolines containing gasoline produced from the cracking of mineral oils, which comprises mixing therewith and dissolving therein an aromatic benzene homologue acting as an anti-catalyst and selected from a group consisting of anthracene, phenanthrene, phenol, ortho-cresol, meta-cresol, para-cresol and guaiacol, said homologue being used in a ratio of not more than about 0.016 per cent by weight of the gasoline treated.

8. A motor fuel mixture, comprising cracked gasoline and anthracene dissolved therein, the quantity of anthracene being sufficient to render the fuel stable to the action of light but comprising not more than about one one-hundredth of one per cent by weight of the motor fuel mixture.

9. A motor fuel mixture, comprising a refined and sweetened blend of cracked and straight run gasoline, and an anti-catalyst adapted to prevent cloud formation in said fuel, said anti-catalyst comprising substantially only anthracene and in not more than about one one-hundredth of one per cent by weight of the mixture.

10. A motor fuel mixture, comprising cracked gasoline, and from two to four pounds of an organic anti-catalyst to one hundred barrels of motor fuel, said anti-catalyst comprising substantially only anthracene.

11. A motor fuel mixture, comprising gasoline, and approximately one one-hundredth of one per cent by weight of an organic anti-catalyst selected from the group comprising anthracene and phenanthrene dissolved in the gasoline.

12. A gum and cloud-free motor fuel comprising gasoline and an aromatic benzene homologue acting as an anti-catalyst selected from a group consisting of anthracene, phenanthrene, phenol, ortho-cresol, meta-cresol, para-cresol and guaiacol, said homologue being present in a ratio of not more than two pounds to 100 barrels of gasoline.

In testimony whereof I affix my signature.

AUGUST P. BJERREGAARD.